UNITED STATES PATENT OFFICE.

DANIEL B. BANKS, OF BALTIMORE, MARYLAND.

PROCESS OF DRYING.

1,190,702.  Specification of Letters Patent.  Patented July 11, 1916.

Application filed April 21, 1914. Serial No. 833,368.

*To all whom it may concern:*

Be it known that I, DANIEL B. BANKS, a citizen of the United States, residing at Baltimore city, in the State of Maryland, have invented certain new and useful Improvements in the Process of Drying, of which the following is a specification.

This invention relates to the process of drying cellular, fibrous or porous substances, such as lumber, wool, cane, matte and other similar substances, and has for its object the extraction and collection of any fluids contained therein.

In this specification I will more fully treat of my process as applied to the lumber industry, but do not wish to limit myself thereto, as the same process is useful in many other industries.

The object of my improved process is to reduce the time required for seasoning lumber or other adaptable substances.

A further object of my improvement is the providing of a process for drying certain destructible substances whereby the evaporate may be obtained.

A further object of my improvement is the treatment of the substances first above mentioned to fix therein such elements contained, as may be desirable.

With the foregoing and other objects in view, my process consists of the novel treatment, combination and arrangement of acts as herein specifically described and demonstrated by the accompanying drawings, wherein is shown an apparatus capable of having my process practised therein, but it is understood that changes, variations and modifications can be resorted to which come within the scope of the claims hereunto appended.

Ordinarily it takes from 30 days to 6 months in the atmosphere or from 3 to 6 days in kilns to properly dry or season lumber for the market, by my process the same result is accomplished in a less number of hours than the days required in atmosphere.

To more fully understand my process I will refer to the accompanying drawings in which—

Figure 1:
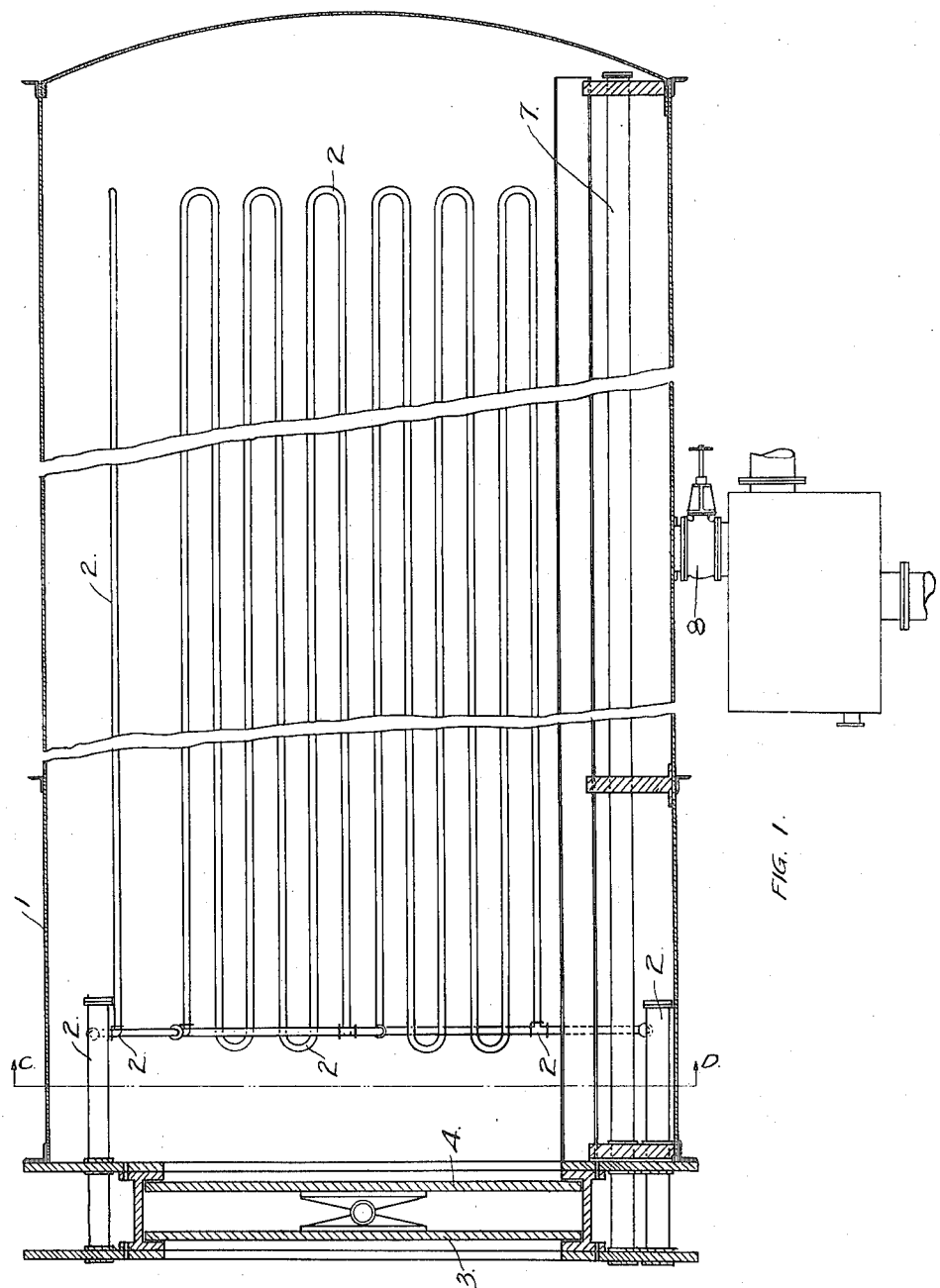
Figure 2:
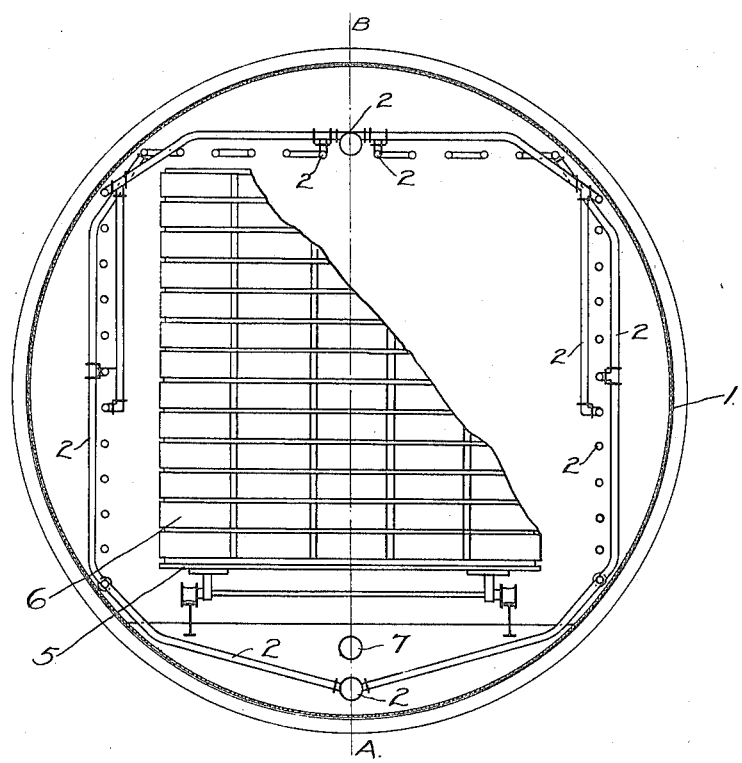

Figure 1 shows a longitudinal section of a drier; Fig. 2, a transverse section of the same drier taken through "C D" of Fig. 1, Fig. 1 being taken through line "A B" of Fig. 2.

Similar numerals refer to similar parts throughout the several views.

1. is the shell of sufficient strength to stand internal pressure and the external pressure where a vacuum is applied. In other words to be able to withstand pressure both external and internal of such a range as practice may show to be necessary or advisable.

2. are heating coils contained within the shell and are supplied with such heating fluids or gases as may be required.

3 and 4. are the gates of a valve which is the door giving entrance to the drier. Between these gates a liquid or gas is introduced under pressure, greater than that within the drier, and more than atmospheric pressure thus forming a seal.

5. is the lumber buggy or car on which is stacked the lumber or substance 6 to be dried.

7. is a live steam pipe opening into shell 1.

The operation of my process is as follows—lumber or any substance to be dried is placed in a suitable manner in the drier (lumber stacked, other substances opened up), after the opening is properly closed and sealed, the interior of the shell is then brought under pressure; which may be done by the application of external heat or live steam or other heating liquids or gases, such pressure and temperature varying with the substance operated upon so as not to injure it by the heat or pressure. Also heating fluids or gases are turned into the heating pipes at a desired temperature and pressure. The above temperatures are maintained for such period of time as found to be suitable, depending upon the heat used and the material operated upon.

At the desired point of time the drier is connected with a vacuum pump or condenser. If it is advisable to save the distillate, a surface condenser is preferable. Simultaneously, all means used to bring the interior of the shell under pressure are perfectly controlled and used to such extent as is found desirable. The heat in the coils as yet remaining constant, is also varied as found suitable. This connection with the condenser permits the steam or other heating liquids or gases to flow away from the shell, which tends to create a vacuum therein and reduces the temperature of boiling point. This induces a rapid giving off of the vapor contained in the substance being dried. This process is continued until the proper amount of moisture is drawn away, the length of time being dependent upon the substance and its condition of moisture. At this point the heating fluids or gases are cut out of the radiating pipes and the material, after cooling, withdrawn from the shell.

Under certain conditions it may be desirable that the transition from pressure to vacuum be extremely gradual in order to maintain the desired conditions of the medium surrounding the substance being dried, especially, regarding the degree of saturation of the same.

To more fully understand my process I will give in detail as an example the seasoning of 1"x12" cypress lumber, which ordinarily requires from six to seven days in the ordinary kiln to season to shipping weight, which is about three-fifths of that of green lumber. The lumber is stacked on a truck with stickers and placed in the kiln or shell 1. The gates 3 and 4 either one or both are closed as may be required to make the kiln tight and steam is turned into the heating coils 2 at say 100 lbs. pressure. Drain or exhaust valve 8 leading from shell 1 into the condenser is opened, live steam is then gradually let into shell 1 through pipe 7 until the lumber is heated up and steam begins to pass valve 8. valve 8 is then closed and the pressure in shell 1 raised to say 30 lbs. above atmosphere, which pressure is maintained for some minutes, perhaps an hour by admitting steam at 30 lbs. pressure through pipe 7. Then valve 8 is opened and the pressure in shell 1 allowed to drop very gradually, say at the rate at first of three lbs. per hour, steam being all of the time admitted through pipe 7 to maintain this drop, the heating coils 2 being maintained at such a temperature as will insure dry saturated steam in cylinder 1 during the drop of pressure. As the pressure decreases the rate of decrease is made less say when 10 lbs. above atmosphere is reached a lowering of 2 lbs. per hour is allowed the pressure is reduced to say 10 lbs. below atmosphere (*i. e.* 5 lbs. absolute). At the latter stages a slight superheating takes place as a temperature of say 200 degrees F. is maintained, boiling point being about 126 degrees for the above pressure. The heating coils are then turned off, also the live steam in pipe 7, the vacuum is maintained for some time during the cooling until the heat drops below the saturated temperature, when the vacuum is broken and the lumber removed.

Having thus described my process, what I claim and desire to secure by Letters Patent is:—

1. The process of drying substances consisting of subjecting the same first to a pressure of a heated medium then evaporating therefrom at a decreasing pressure while supplying heat to the same during evaporation.

2. The process of drying substances consisting of, submitting the same to a steam pressure, then reducing the pressure below atmospheric pressure and simultaneously maintaining a superheated condition of the surrounding medium.

3. The process of drying substances, consisting of, subjecting the same to a pressure of a heated condensable medium at substantially the dew point thereof, then evaporating therefrom at a decreasing pressure.

4. The process of drying substances, consisting of, subjecting the same to a pressure of a heated condensable medium, at substantially the dew point thereof, then evaporating therefrom at a decreasing pressure while supplying heat to the same during said evaporation.

DANIEL B. BANKS.

Witnesses:
Wm. D. Janney,
Harry W. Peirson, Jr.